Sept. 14, 1965     M. A. MESSA     3,206,031
LIQUID DISPENSER FOR THE PURIFICATION
AND FILTRATION OF WATER
Filed March 2, 1962     2 Sheets-Sheet 1
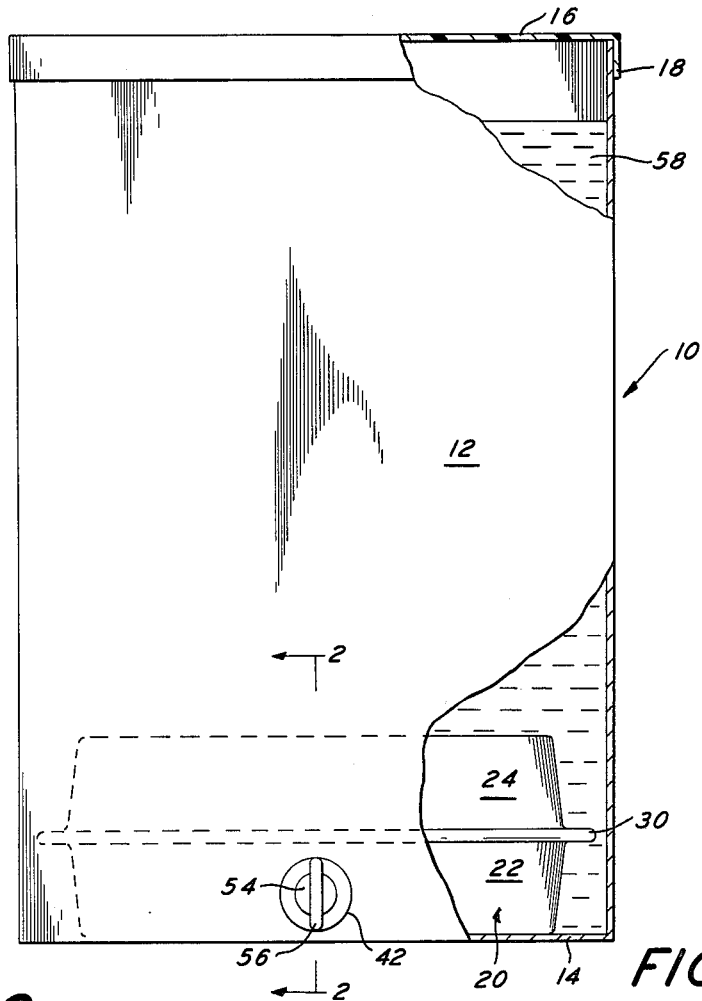
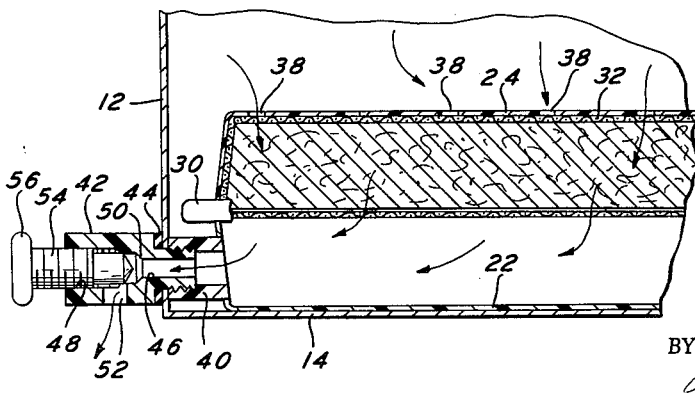
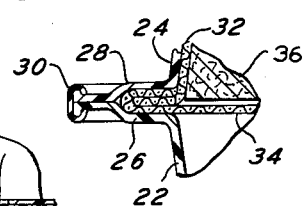
INVENTOR.
MATTHEW A. MESSA
BY
Arthur H. Seidel
ATTORNEY Sept. 14, 1965  M. A. MESSA  3,206,031
LIQUID DISPENSER FOR THE PURIFICATION
AND FILTRATION OF WATER
Filed March 2, 1962  2 Sheets-Sheet 2

INVENTOR.
MATTHEW A. MESSA
BY
Arthur H. Seidel
ATTORNEY

United States Patent Office 3,206,031
Patented Sept. 14, 1965

3,206,031
LIQUID DISPENSER FOR THE PURIFICATION
AND FILTRATION OF WATER
Matthew A. Messa, Philadelphia, Pa., assignor to Met-Pro,
Inc., Lansdale, Pa., a corporation of Pennsylvania
Filed Mar. 2, 1962, Ser. No. 177,051
6 Claims. (Cl. 210—172)

This invention relates to a liquid dispenser, and more particularly, to a liquid dispenser adapted to be utilized to provide a supply of purified and filtered water.

The liquid dispenser of the present invention is in the nature of a container having a removable top, a filter unit adapted to be disposed within the container, and a valve means structurally interrelated with the filter unit whereby filtered water may be dispensed therefrom. The filter unit is designed so as to be a backwashed and reusable or throw away unit. The dispenser of the present invention is particularly useful in areas wherein filtered water suitable for drinking is not readily available. When in use, the present invention will be capable of providing a supply of potable water.

The present invention is adapted to be utilized to provide a source of potable water from contaminated water. A chloride or the like is introduced into the container of contaminated water to kill bacteria. The filter unit removes turbidity from the contaminated water.

It is an object of the present invention to provide a novel dispenser.

It is another object of the present invention to provide a simple, inexpensive purification and filtration dispenser particularly useful in areas wherein only a contaminated source of water is available.

It is another object of the present invention to provide a novel dispenser utilizing a novel filter unit.

It is another object of the present invention to provide a novel, lightweight, non-corrosive filtration dispenser.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a side elevation view of the dispenser of the present invention with portions broken away for purposes of illustration.

FIGURE 2 is a sectional view taken along the lines 2—2 in FIGURE 1.

FIGURE 3 is an enlarged detailed view of the interconnection between the parts of the filter unit.

Referring to the drawing in detail, wherein like numerals indicate like elements, there is shown in FIGURE 1 a dispenser designated generally as 10.

Figure 4:
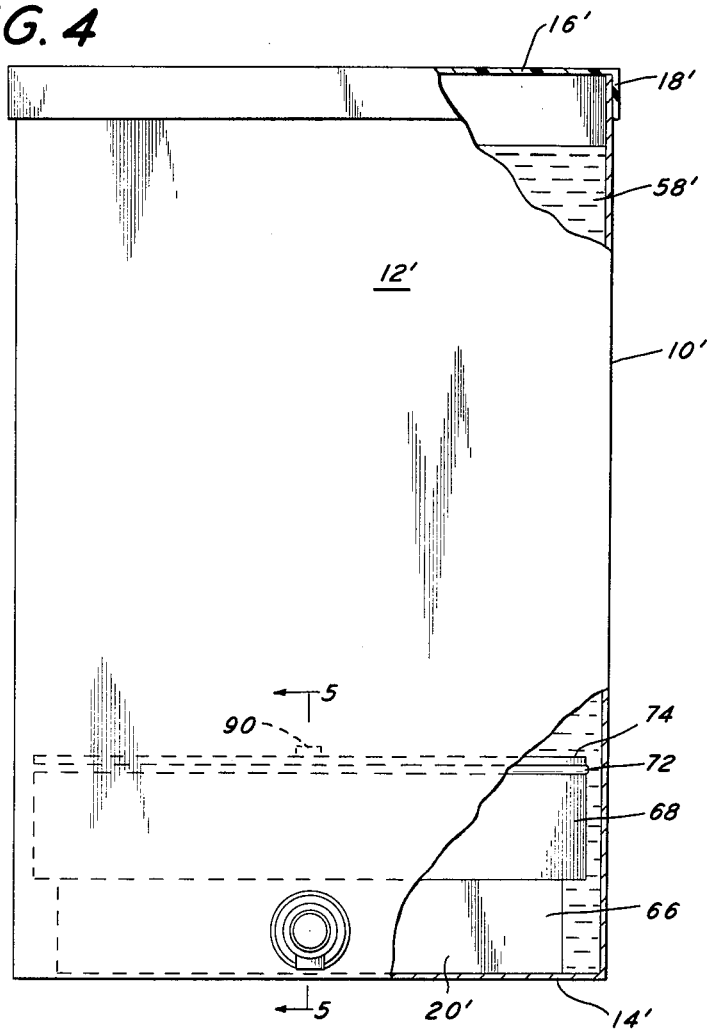
FIGURE 4 is a side elevation view of another embodiment of the present invention.

The dispenser 10 includes a container having a side wall 12, an open top, and a bottom wall 14. The wall 12 may be in the nature of a cylinder if desired. Preferably, the container is made from a lightweight non-corrosive material such as a rigid plastic, aluminum, etc. The open top of the container is selectively closed by a cover 16. The cover 16 is provided with a peripheral flange 18 which overlies the side wall 12.

The cover 16 is preferably made from a flexible plastic such as polyethylene. The flange 18 is integral with the cover 16 and may have a force fit with the outer peripheral surface of the wall 12. It will be appreciated that any one of a wide variety of other means may be utilized to retain the cover 16 on the open end of the container.

A filter unit designated generally as 20 is disposed within the container. The filter unit 20 is composed of two dish-shaped members 22 and 24 having radially outwardly directed peripheral flanges 26 and 28, respectively. As will be evident from a comparison of FIGURE 1 and 2, the diameter of the filter unit 20 is less than the inner diameter of the container. Hence, the filter unit 20 is spaced radially inwardly from the inner surface of the container.

The flanges 26 and 28 are releasably held in abutting contact by means of a clamp 30. The clamp 30 is preferably C-shaped in cross section and made from a flexible resilient plastic such as polyethylene.

A dish-shaped screen 32 is disposed within the member 24. A flat screen 34 overlies the member 24 and a portion of the flange 28. The free edge of the screen 34 is bent back over itself and a flange on the screen 32 is disposed between the free edge of the screen 34 and the portion thereof between the flanges 26 and 28. The screens 32 and 34 are preferably made from a non-corrosive material such as plastic, brass, aluminum, etc. An expendable filter 36 is disposed within the receptacle formed by the screens 32 and 34. The base of the member 24 is provided with a plurality of holes 38.

The base of member 22 is imperforate and rests on the bottom wall 14 of the container. A hollow bushing 40 extends from a side wall of the member 22. The bushing 40 may be integral with the member 22 or may be force-fitted in a hole therein. The bushing 40 is of sufficient length so that it extends beyond the periphery of the clamp 30.

A hole is provided in the side wall 12 of the container adjacent the bottom wall 14. The last mentioned hole is spaced from the plane of the bottom wall 14 by a distance so that it will be in line with the inner periphery of the bushing 40. A reduced diameter portion on a valve housing 42 extends through the last mentioned hole. A gasket seal 44 is provided between the side wall 12 and a juxtaposed portion of the housing 42. The reduced diameter portion on the housing 42 is interconnected with the bushing 40. As illustrated, the reduced diameter portion is provided with external threads which mate with internal threads on the inner periphery of the bushing 40. If desired, the reduced diameter portion on the housing 42 may have a force fit with the inner periphery of the bushing 40.

The housing 42 is provided with concentric bores 46 and 48 which extend for the full length of the housing 42. The bores 46 and 48 are separated by a beveled valve seat 50. A bore is provided in the housing 42 so as to provide communication between the outlet port 52 and the bore 48.

The bore 48 is internally threaded and in mating engagement with external threads on a valve member 54. One end of the valve member 54 is provided with a tapered head adapted to selectively cooperate with the valve seat 50 to control flow through the valve housing 42. The other end of the valve member 54 is provided with a flat thin handle 56 which facilitates the application of rotary energy to the valve member 54 to cause the same to rotate and reciprocate in the bore 48.

The dispenser 10 is utilized as follows:

The dispenser 10 is particularly useful in those areas where there is no ready supply of potable drinking water. Brackish water 58 will be poured or otherwise discharged into the open top of the container. A material capable of killing bacteria will be added to the water 58. Such material, for example, may be sodium hypochlorite. Thereafter, the cover 16 will be placed over the open top as illustrated in FIGURE 1. When the valve member 54 is rotated in a counter clockwise direction in FIGURE 1, the valve head will be moved away from the valve seat 50 so that the water 58 may flow through the filter unit 20, bushing 40, bore 46 and outlet port 52.

The water 58 can only enter the filter unit 20 through the holes 38. The holes 38 are on the upper surface of the filter unit 20. The space between the filter unit 20 and the inner peripheral surface of the container permits accumulation of heavy solid particles therein. The filter 36 will remove all turbidity from the water 58. Turbidity will include solid particles, mucus, oil, etc. Any one of a wide variety of materials may be utilized for the filter 36. For example, a filter made from aluminum wool may be utilized for the filter 36. The filter 36 is preferably a porous type filter. Solid particles will be removed and prevented from entering the filter 36 by means of the screen 32.

When the filter becomes contaminated, the connection between the bushing 40 and the reduced diameter portion of the housing 42 is readily separated. Thereafter, the filter unit 20 may be backwashed and reused or thrown away and a new one substituted therefor. At this time, the interior of the container may be cleaned so as to remove all foreign matter and sediment. The size of the filter unit 20 with respect to the size of the container facilitates movement of the filter unit 20 within the container so that the bushing 40 will be aligned with the hole in the side wall 12. Thereafter, the housing 42 will be connected with the bushing as illustrated in FIGURE 2. Suitable flats may be provided on the outer periphery of the housing 42 to facilitate rotating the same when the reduced diameter portion of the housing 42 is to be threadedly engaged with the bushing 40.

If desired, the entire filter unit 20 need not be expendable. That is, the clamp 30 may be removed and the members 22 and 24 separated from one another. Thereafter, the screens 32 and 34 with the filter 36 therebetween may be thrown away and a new screen and filter unit substituted therefor. Thereafter, the members 22 and 24 will be reassembled in the manner illustrated in FIGURE 3. It is to be noted that the interconnection between the housing 42 and the bushing 40 need not be disturbed when the screen filter unit 32, 34 and 36 is the only expendable part of the filter unit 20. That is, the member 22 will remain resting on the bottom wall 14 at all times. The space between the clamp 30 and the inner peripheral surface of the container is sufficient so as to enable the clamp 30 to be removed.

The cover 16 is preferably provided on the container at all times so as to prevent entry of air-borne foreign matter from being deposited therein. The housing 42 is preferably associated with the side wall 12 thereby permitting the flat bottom wall 14 to rest on any convenient surface. As illustrated, the members 22 and 24 are identical except for the provision of the holes 38 in the member 24. The member 22 need not be identical with the member 24. The simplicity of the present invention and the cost thereof are reduced by utilizing two members 22, and providing holes 38 in one of the members thereby converting the same into a member 24.

Figure 5:
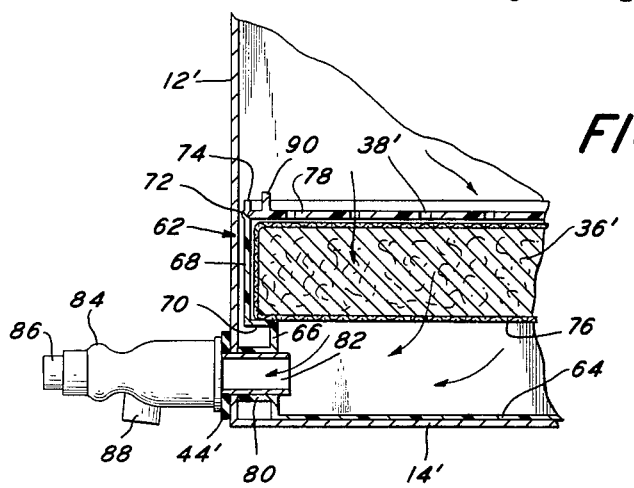
FIGURE 5 is a sectional view taken along lines 5—5 in FIGURE 4.

In FIGURES 4 and 5, there is disclosed another embodiment of the present invention designated as 10'. The dispenser 10' is identical with dispenser 10 except as will be made clear hereinafter. Hence, primed numerals are utilized for corresponding structure of the dispensers 10 and 10'.

A filter unit 20' is positioned within the container of dispenser 10'. The filter unit 20' includes a cup-shaped housing 62 having a bottom wall 64 overlying the bottom wall 14' of the container. The housing 62 includes annular walls 66 and 68 interconnected by shoulder 70. A groove 72 is provided in wall 68 on the inner surface thereof below and adjacent lip 74. A filter cartridge comprising filter material 36' disposed within a screen housing 76 rests on shoulder 70. A lid 78 having perforations 38' therethrough has its periphery snap-fitted in groove 72. The distance between shoulder 70 and groove 72 is slightly greater than the thickness of the filter cartridge.

The chamber in housing 62 below shoulder 70 is provided with an outlet port defined by an annular flange 80 extending from wall 66. A conduit extension 82 of a valve 84 extends through wall 12' and is force-fitted in flange 80. Valve 84 is provided with a push button actuator 86 and a dispensing spout 88.

The housing 62 and lid 78 are made from a flexible non-corrosive material such as polyvinyl chloride, polyethylene, etc. To facilitate removal of lid 78 when access to the filter cartridge is desired, the lid 78 may be provided with a lift tab 90. In view of the above description with respect to dispenser 10, a detailed description of dispenser 10' is not deemed necessary.

The present invention may be embodied in other specific forms without departing from the spirit or essential attributes thereof and, accordingly, reference should be made to the appended claims, rather than to the foregoing specification as indicating the scope of the invention.

I claim:

1. A liquid dispenser comprising a container having a bottom wall, a selectively operable valve means coupled to said container adjacent said bottom wall, a flat hollow filter unit in said container on said bottom wall, said filter unit including upper and lower chambers, at least a portion of the wall of said upper chamber having holes extending therethrough, a removable porous receptacle within said upper chamber, said receptacle completely filling said upper chamber, filter material housed within said receptacle to completely fill said receptacle and upper chamber, means for retaining said receptacle in said upper chamber to thereby separate said chambers, the lower chamber providing a reservoir with a flat bottom wall for accumulation of sediment not filtered by the filter material within said receptacle, said lower chamber also including an outlet through a side wall thereof, said outlet being above said flat bottom wall of said lower chamber, and a conduit directly connecting said outlet of said lower chamber to an inlet port on said valve means.

2. A dispenser in accordance with claim 1 wherein said upper chamber includes a shoulder, said receptacle being seated on said shoulder, said upper chamber including a removable top wall having holes extending therethrough, and means on said top wall for readily enabling the removal thereof from said upper chamber and access to said receptacle.

3. A dispenser in accordance with claim 1 wherein said chambers in said hollow filter unit comprise upper and lower dish-shaped members of equal size having radially outwardly extending flanges at their open ends, the base of said upper member having holes extending therethrough, and means clamping the flanges on said members in abutting engagement.

4. A dispenser in accordance with claim 3 wherein said receptacle is a screened housing, said screened housing having a radially outwardly directed flange disposed between the flanges on said upper and lower members.

5. A dispenser in accordance with claim 4 wherein said clamping means includes a C-shaped clamp of flexible plastic material embracing the periphery and peripheral portions of said flanges on said members, a flexing of said clamp providing a convenient removal thereof.

6. A liquid dispenser comprising a container having a bottotm wall, a selectively operable valve means coupled to said container adjacent said bottom wall, a hollow filter unit in said container, said filter unit including upper and lower chambers of substantially the same size, at least a portion of the walls of said upper chamber having holes extending therethrough, a removable screen receptacle within said upper chamber, said receptacle completely filling said upper chamber, filter material housed within said receptacle to completely fill said receptacle and upper chamber, flange means on said receptacle extending from an upright wall portion of the receptacle to a position between outer peripheral portions of said chambers for retaining said receptacle in said upper chamber, and means for providing communication between an inlet port on said valve means and a peripheral wall of the lower chamber below the receptacle.

References Cited by the Examiner

UNITED STATES PATENTS

| | | | |
|---|---|---|---|
| 292,912 | 2/84 | Heath | 210—445 X |
| 794,107 | 7/05 | Knight | 210—489 |
| 880,685 | 3/08 | Montanye | 210—484 |
| 970,504 | 9/10 | Hull | 210—445 |
| 1,110,852 | 9/14 | Wise | 210—489 X |
| 1,661,290 | 3/28 | Jewett | 210—172 |
| 2,665,009 | 1/54 | Harstick | 210—489 X |
| 2,808,937 | 10/57 | O'Meara | 210—445 |
| 2,931,507 | 4/60 | Kent | 210—445 |

REUBEN FRIEDMAN, *Primary Examiner.*

HERBERT L. MARTIN, *Examiner.*